United States Patent
Okumura

Patent Number: 6,008,871
Date of Patent: Dec. 28, 1999

[54] TRANSFLECTIVE LIQUID CRYSTAL DISPLAY DEVICE HAVING A REFLECTIVE POLARIZER

[75] Inventor: Osamu Okumura, Nagano, Japan

[73] Assignee: Seiko Epson Corporation, Japan

[21] Appl. No.: 09/009,530

[22] Filed: Jan. 20, 1998

[30] Foreign Application Priority Data

| Jan. 20, 1997 | [JP] | Japan | 9-008072 |
| Oct. 20, 1997 | [JP] | Japan | 9-287157 |

[51] Int. Cl.$^6$ .................................................. G02F 1/1335
[52] U.S. Cl. ............................... 349/61; 349/64; 349/113; 349/114
[58] Field of Search .................................. 349/114, 162, 349/64, 61, 113

[56] References Cited

U.S. PATENT DOCUMENTS

| 4,637,687 | 1/1987 | Haim et al. | 349/81 |
| 4,838,661 | 6/1989 | McKee et al. | 349/68 |
| 5,686,979 | 11/1997 | Weber et al. | 349/96 |
| 5,691,788 | 11/1997 | Kim | 349/96 |
| 5,751,388 | 5/1998 | Larson | 349/96 |
| 5,825,542 | 10/1998 | Cobb, Jr. et al. | 359/487 |

FOREIGN PATENT DOCUMENTS

| WO95/17303 | 6/1995 | WIPO . |
| WO95/17691 | 6/1995 | WIPO . |
| WO95/17692 | 6/1995 | WIPO . |
| WO95/17699 | 6/1995 | WIPO . |
| WO95/27919 | 10/1995 | WIPO . |
| WO96/19347 | 6/1996 | WIPO . |
| WO97/01439 | 1/1997 | WIPO . |
| WO97/01440 | 1/1997 | WIPO . |
| WO97/01610 | 1/1997 | WIPO . |
| WO97/01726 | 1/1997 | WIPO . |
| WO97/01774 | 1/1997 | WIPO . |
| WO97/01778 | 1/1997 | WIPO . |
| WO97/01780 | 1/1997 | WIPO . |
| WO97/01781 | 1/1997 | WIPO . |
| WO97/01788 | 1/1997 | WIPO . |
| WO97/01789 | 1/1997 | WIPO . |
| WO97/07653 | 2/1997 | WIPO . |

*Primary Examiner*—William L. Sikes
*Assistant Examiner*—Heidi L. Eisenhut
*Attorney, Agent, or Firm*—Harness, Dickey & Pierce, P.L.C.

[57] ABSTRACT

A transflective liquid crystal display device comprising a liquid crystal panel made of liquid crystal compound sandwiched between a pair of opposing substrates having transparent electrodes, a polarizer disposed on the viewer's side of said liquid crystal panel, a reflective polarizer disposed on the opposite side of the liquid crystal panel as the polarizer, and a backlight assembly. The reflective polarizer reflects light having a predetermined polarization orientation and transmits light having a different polarization orientation from the predetermined polarization orientation. Also, the backlight assembly is substantially black in a non-emissive state.

14 Claims, 12 Drawing Sheets

*Fig.3a*
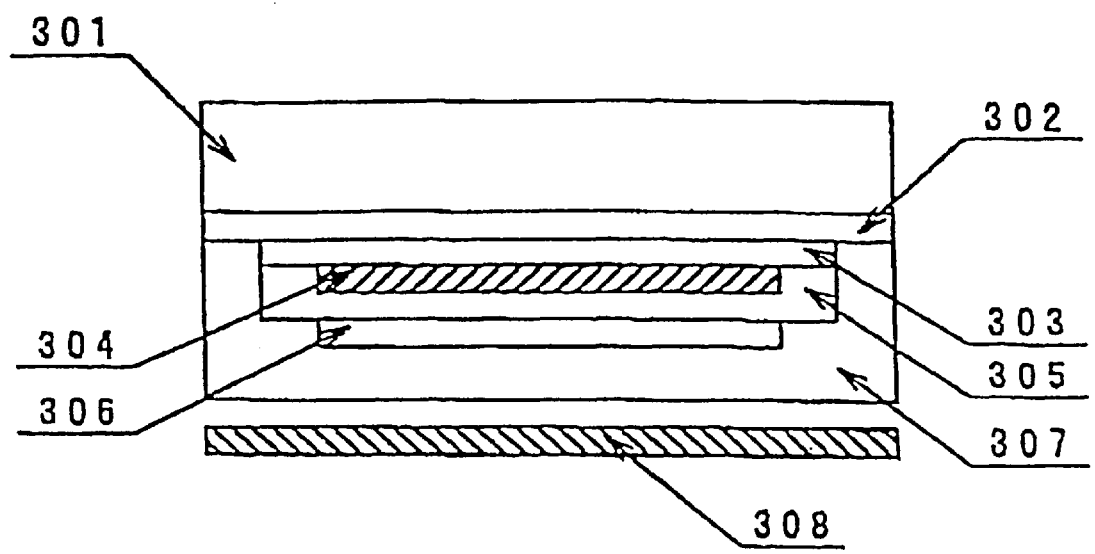
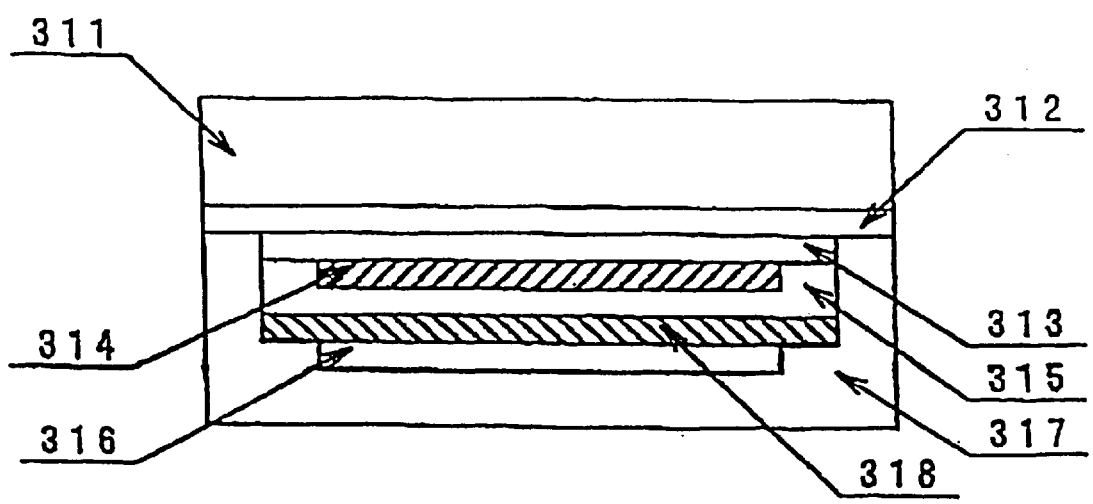
*Fig.3b*

TRANSFLECTIVE LIQUID CRYSTAL DISPLAY DEVICE HAVING A REFLECTIVE POLARIZER

DETAILED DESCRIPTION OF THE INVENTION

1. Industrial Field of the Invention

This invention relates to a liquid crystal display device. More specifically, the invention relates to a so-called transflective liquid crystal display device which is capable of being switched between a transmissive display mode and a reflective display mode by switching a backlight assembly between ON and OFF states. Further, the present invention relates to an electronic apparatus equipped with such a liquid crystal display device.

2. Description of the Related Art

A liquid crystal display device is a light-receiving display device and when a reflective liquid crystal display device is viewed in a dark place, it requires some supplemental lighting. Accordingly, liquid crystal display devices were devised which had a backlight assembly disposed on a back of a liquid crystal panel. The backlight assembly is used by switching between the reflective mode and the transmissive mode according to external requirements. This is the so-called transflective liquid crystal display device.

Referring to FIG. 11, a construction of a conventional transflective liquid crystal display device is described. In FIG. 11, 1101 is an upper polarizer, 1102 a retardation film, 1103 an upper glass substrate, 1104 transparent electrodes, 1105 a liquid crystal layer, 1106 a lower glass substrate, 1107 a lower polarizer, 1108 a transflective plate, and 1109 a backlight assembly. The transflective plate 1108 is a sheet made of plastic resin within which, for example, pearl pigment beads are dispersed for reflecting 70% and transmitting 30% of incident light (in another type, reflecting 50% and transmitting 50%). It is switched between the reflective and transmissive modes by an ON and OFF state of the backlight assembly.

Next, referring to FIG. 12, the construction of the backlight assembly 1109 is described. In FIG. 12, 1201 and 1202 are light diffusing plates, 1203 a light guide plate, 1204 a light source, and 1205 a light reflecting plate. Light scattering bodies 1206 are printed over the surface of the light guide plate. The light diffusing plates 1201 and 1202 are often used in a lamination of plural sheets as shown in this example, but sometimes it is used in only a single sheet. Also, a prism sheet may be disposed in some cases under the light diffusing plate 1201. This backlight assembly exhibits white color in a non-emissive mode, as the light diffusing plates have whitish diffusing color, the light guide plate being transparent, and the light reflecting plate being glossy white.

In the aforementioned conventional transflective liquid crystal display device, a part of the light incident on the surface of the transflective plate is transmitted through the transflective plate, which causes a problem in that the display in the reflective mode becomes darker by the same amount as the light transmitted (with 50–70% of the brightness compared with a pure reflective liquid crystal display device). Further, the light emitted from the backlight assembly is attenuated by passing through the transflective plate, causing the display in the transmissive mode to be darker. As a result, there is a problem in that the efficiency of light utilization is poor.

Therefore, it is an object of the present invention to provide a liquid crystal display device which offers a bright display in the transmissive mode and utilizing the light from the backlight assembly efficiently without damaging the brightness of the display in the reflective mode.

SUMMARY OF THE INVENTION

In order to solve the aforementioned problems, the liquid crystal display device of the present invention is characterized in that it comprises a liquid crystal panel made of liquid crystal sandwiched between a pair of substrates, a polarizer disposed on the viewer's side of the liquid crystal panel and a reflective polarizer disposed on the opposite side of the liquid crystal panel as the polarizer. The reflective polarizer reflects light having a predetermined polarization orientation and transmits light having a different polarization orientation from the predetermined polarization orientation. A backlight assembly is disposed on the opposite side of the reflective polarizer as the liquid crystal panel and has a light absorbing capability in a non-emissive state.

In the reflective mode, almost 100% of the polarization component having the predetermined orientation of the light incident from the side of the liquid crystal panel into the reflective polarizer is reflected to the side of the liquid crystal panel. As such, when the light transmitted through the liquid crystal panel is the polarization component of the light with the predetermined orientation, a bright display state is available. The light oriented differently from the polarization component with the predetermined orientation of the light incident from the side of the liquid crystal display device panel into the reflective polarizer is transmitted through the reflective polarizer to exit toward the backlight assembly which has a light absorbing capability. As such, when the light transmitted through the liquid crystal panel is the polarization component of the light oriented differently from the predetermined orientation, a dark display state is available.

Also, in the transmissive display mode, the polarization component oriented differently from the predetermined orientation of the light emitted from the backlight assembly passes the reflective polarizer to exit towards the liquid crystal panel, while the polarization component with the predetermined orientation of the light emitted from the backlight assembly is reflected by the reflective polarizer toward the liquid crystal panel and a part of such light is scattered or reflected on the surface of the backlight assembly to change its orientation of polarization and finally to pass through the reflective polarizer. Therefore, most of the light emitted from the backlight assembly is transmitted through the reflective polarizer, resulting in an improvement of the efficiency of the utilization of light from the backlight assembly to attain a bright display in the transmissive mode.

It is preferable to use a birefringent multi-layered dielectric sheet for the reflective polarizer of the present invention. Alternatively, a reflective polarizer with a construction of cholesteric layers sandwiched between quarter wave plates can be employed.

Also, as a backlight assembly having a light absorbing capability in the non-emissive state of the present invention, a backlight assembly including a member for emitting the light toward the direction of the reflective polarizer and a light absorbing body capable of absorbing the light incident from the direction of the reflective polarizer can be employed.

In this instance, it is preferable to provide the light absorbing body on the rear surface of the substantially transparent light emitting member. By such construction, the light from the light emitting member can be emitted towards the reflective polarizer side without being absorbed by the light absorbing body in the transmissive display mode. In the reflective display mode, the light incident from the direction of the reflective polarizer side to the backlight assembly passes through the light emitting member to be absorbed by the light absorbing body. An embodiment of such a backlight assembly is a backlight assembly made of an EL (electroluminescent) element with the light absorbing body disposed on its rear surface.

Also, a backlight assembly including a light source, a light guide for emitting the light from the light source toward the direction of the reflective polarizer and a light absorbing body for absorbing the light incident from the direction of the reflective polarizer can be employed as a backlight assembly of the present invention having a light absorbing capability in the non-emissive state. In this case, it is preferable to provide the light absorbing body on the back surface of the light guide. By such construction, the light from the light emitting member can be emitted toward the direction of the reflective polarizer without being absorbed by the light absorbing body in the transmissive display mode. In the reflective display mode, the light incident from the direction of the reflective polarizer to the backlight assembly passes through the light guide to be absorbed by the light absorbing body. Embodiments of such backlight assemblies are those backlight assemblies made of combinations of a fluorescent tube or LED and a light guide with the light absorbing body attached to its back surface.

Also, organic LED, VFD (a fluorescent character display tube), LED array or a flat CRT can be employed as backlight assemblies. In those cases, the backlight assemblies have an advantage of providing a light absorbing capability without any requirement of otherwise providing a light absorbing body, because these backlight assemblies can be constructed to have an inherent light absorbing capability in the non-emissive state.

By the way, the light absorbing capability in the present invention refers to a capability to absorb the light incident from the liquid crystal panel to the extent that a sufficiently dark display state is available in the reflective mode compared with the bright display state. More specifically, it is preferable that the luminance factor of the backlight assembly in the non-emissive state is 40% or less and 20% or less is more preferable. Further, if the color of the backlight assembly in the non-emissive state is substantially black, the best contrast characteristic is obtained. The luminance factor refers here to "a ratio of the luminance of an object to that of the perfect diffuse reflector where illumination and observation are made under the same conditions" as defined in 2 (3) of JIS Z 8722 (1982) "The Method for Measuring Color of Reflecting or Transmissive Object". Also, as the illuminating conditions, the condition C is taken which is defined in 4. 3. 1 (3) of JIS Z 8722 (1982). The condition C defines that "the specimen shall be illuminated uniformly from all directions and the reflected light in the direction forming an angle of 10 degrees or less referring to the normal line to the specimen surface shall be received."

Also, the liquid crystal display device of the present invention is characterized in that it comprises a liquid crystal panel made of liquid crystal sandwiched between a pair of substrates, the liquid crystal panel being adapted to be able to switch between a first state for reflecting light with a predetermined polarization orientation, while transmitting light with a different polarization orientation from the predetermined polarization orientation and a second state for transmitting almost all of the light and a backlight assembly disposed on the back of the liquid crystal panel having a light absorbing capability in a non-emissive state.

According to the liquid crystal display device of the present invention, in the first state of the reflecting mode, it is possible to obtain a bright display state, since the polarization component with a predetermined orientation of the light incident on the liquid crystal panel is reflected within the liquid crystal panel. In the second state of the reflecting mode, almost all of the light incident on the liquid crystal panel is transmitted through the liquid crystal panel to be emitted to the backlight assembly side. As the backlight assembly has light absorbing capability in the non-emissive state, a dark display state is obtained.

Also, in the first state of the transmissive display mode, the polarization component with a different orientation from the predetermined orientation of the light emitted from the backlight assembly passes through the liquid crystal panel, while the polarization component of the light with the predetermined orientation is reflected by the liquid crystal panel to bring the display into the dark display state. On the other hand, in the second state almost all of the light emitted from the backlight assembly passes through the liquid crystal panel to bring the display into the bright display state.

Generally, a liquid crystal panel having such display modes works to reflect light in a range of predetermined wavelengths and to transmit light in a range different from the predetermined wavelengths, i.e., it exhibits a color display in the first state of the reflecting display mode and a dark display in the second state of the reflecting display mode. Also, in the first state of the transmissive display mode, it exhibits a color display with a different color from that of the color displayed in the first state of the reflecting mode and a white display in the second state of the transmissive display mode.

By the way, a liquid crystal panel having such display modes is described in detail in SID92 DIGEST, pp759–to 761.

Also, the liquid crystal display device of the present invention is characterized in that it comprises a liquid crystal panel made of liquid crystal sandwiched between a pair of substrates, a polarizer disposed on the viewer's side of the liquid crystal panel and a reflective polarizer disposed on the opposite side of the liquid crystal panel as the polarizer. The reflective polarizer reflects light with a predetermined polarization orientation and transmits light with a different polarization orientation from the predetermined polarization orientation. A backlight assembly is disposed on the opposite side of the reflective polarizer as the liquid crystal panel. In this device, the polarization axis of the light emitted from the liquid crystal panel can be varied corresponding to the ON and OFF states of the backlight assembly.

In a liquid crystal display device employing a reflective polarizer as a reflector, the polarization component of the light reflected by the reflective polarizer in the reflective mode has a different polarizing orientation from the polarization component of the light transmitted through the reflective polarizer in the transmissive display mode. As such, brightness and darkness is reversed between the reflective mode and the transmissive mode.

In the present invention it is possible to prevent the above-mentioned reversal of brightness and darkness of a display, as the polarization axis of the light emitted from the liquid crystal panel can be varied corresponding to the ON and OFF states of the backlight assembly. As a result, it is possible to obtain a similar display both in the transmissive mode and the reflective mode.

More specifically, it is possible to vary the polarization axis of the light emitted from the liquid crystal panel by employing a liquid crystal panel which is driven by applying a voltage to nodes formed on each crossing point of a plurality of data lines and a plurality of scanning lines and by varying data signals applied to the data lines corresponding to ON and OFF states of the backlight assembly.

Also, it is possible to prevent changes of color between the reflective mode and the transmissive mode even in the color display by converting the data signals so as to make the displayed color in the ON state and that of the OFF state of the backlight assembly have a complementary color relationship.

Also, the electronic apparatus of the present invention is characterized in that it is equipped with any one of such liquid crystal display devices as described above as a display member. Due to the above construction the apparatus has advantages such as reduced power consumption compared with an electronic apparatus equipped with conventional liquid crystal display devices and a brighter and easier-to-see display is obtained than that of an electronic apparatus equipped with conventional liquid crystal display devices.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is a vertical sectional view illustrating the construction of the backlight assembly of the liquid crystal display device of example 1 of the present invention.

FIGS. 5a–5d are vertical sectional views illustrating the construction of the backlight assembly of the liquid crystal display device of example 2 of the present invention wherein FIG. 5a is a light guide plate printed with white paint, FIG. 5b is a light guide plate with sibo (cavities), FIG. 5c is a wave-shaped light guide plate, and FIG. 5d is an air light guide plate.

FIGS. 10a–10c are perspective views illustrating the appearance of electronic apparatus in example 6 of the present invention wherein FIG. 10a is a portable telephone, FIG. 10b is a watch, and FIG. 10c is a portable computer.

DETAILED DESCRIPTION OF THE PREFERRED EMBODIMENTS

Figure 1:
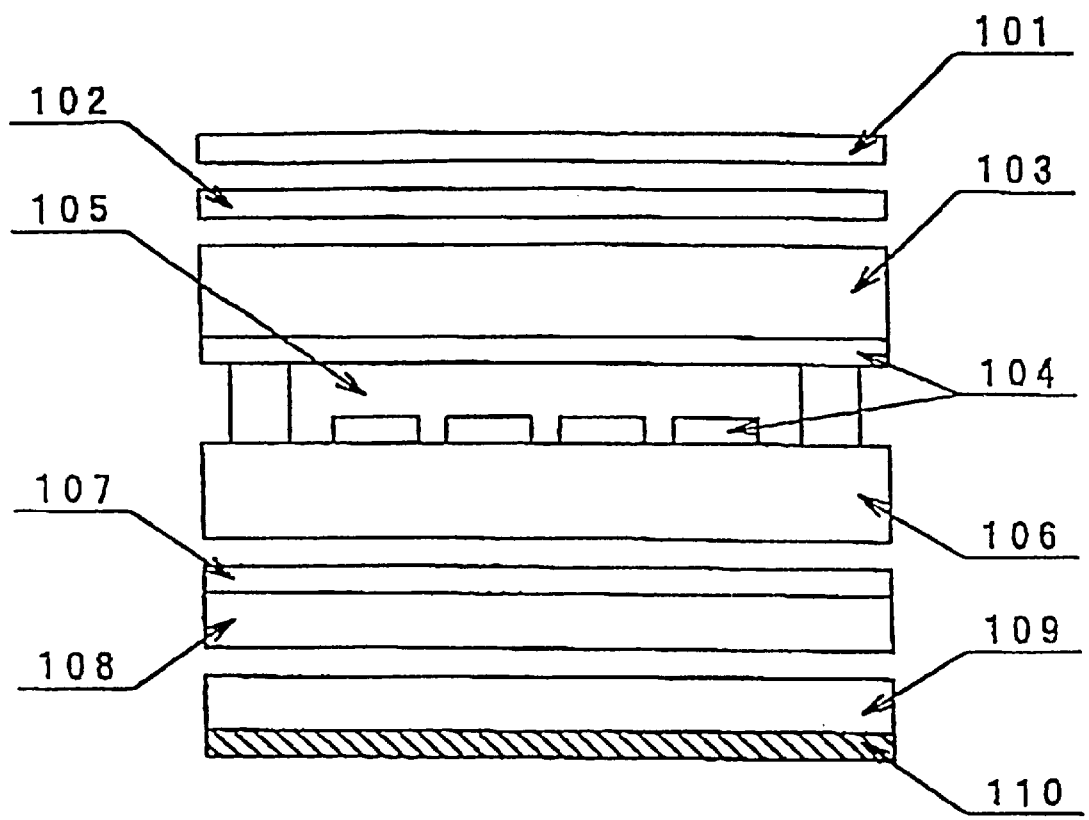
FIG. 1 is a vertical sectional view illustrating the essential part of the construction of the liquid crystal display device of the present invention.

Referring now to the drawings, the present invention is described in detail as follows:

EXAMPLE 1

FIG. 1 is a drawing illustrating the essential part of the construction of the liquid crystal display device of the present invention. First, the construction is described. In FIG. 1, 101 is a polarizer, 102 a retardation film, 103 an upper glass substrate, 104 a transparent electrode, 105 a liquid crystal layer, 106 a lower glass substrate, 107 a light diffusing plate, 108 a reflective polarizer, 109 a light emitting member of a backlight assembly which is substantially transparent in the non-emissive state, and a hatched area of 110 is a light absorbing plate. In this instance, 101 and 102, 102 and 103, 106 and 107 are illustrated as being separated but this is just to make the drawing easy to understand and actually they are bonded with adhesives. Also, the upper glass substrate 103 and the lower glass substrate 106 are depicted to have a wide gap for the same reason but actually they are opposed to each other with a narrow gap of several $\mu$m to a dozen or so $\mu$m. By the way, besides those elements shown, other elements are essential such as a liquid crystal orientation film, dielectric film, anti-glare film, spacer ball, liquid crystal driver IC, driver circuit, etc., but they are omitted as they are not especially necessary to describe the present invention.

Next, each element is described. The polarizer 101 is similar to conventional polarizers which works to absorb the predetermined linear polarization component and transmit polarization components different from the predetermined component.

The retardation film 102 is a uniaxial stretched film of polycarbonate resin especially used to compensate for coloring of the STN liquid crystal display device. It is often omitted in the case of a TN liquid crystal display device.

The liquid crystal layer 105 is made of an STN liquid crystal compound twisted in 210E–270E but if display capacity is small, a TN liquid crystal compound twisted in 90E may be used. The twist angle is determined depending on the direction of orientation alignment of upper and lower glass substrates and the amount of chiral additive added to the liquid crystal.

Light scattering plate 107 can be made of embossed plastic plate or a plastic plate dispersed with beads. Also, beads mixed in the adhesive layer between 106 and 108 can be used as a substitute for a light scattering plate. The light scattering plate 107 is disposed in order to scatter reflected light of the reflective polarizer with a surface somewhat like a mirror but displaying is possible without it. Also, plate 107 can be located not only between 106 and 108 but also can be positioned adjacent to 105 or between 102 and 103 or over 101.

A birefringent multi-layered dielectric film is employed as reflective polarizer 108. The birefringent multi-layered dielectric film works to reflect the predetermined linear polarization component and transmit the polarization component different from the predetermined component. Such a birefringent multi-layered dielectric film is disclosed in detail in internationally publicized international application number: WO97/01788 and Japanese Patent National Publication 9-506985 which are both incorporated by reference herein. Also, such a reflective polarizer is generally available in the market as DBEF (trade name) from Minnesota Mining and Manufacturing Co., U.S.A.

Figure 2:
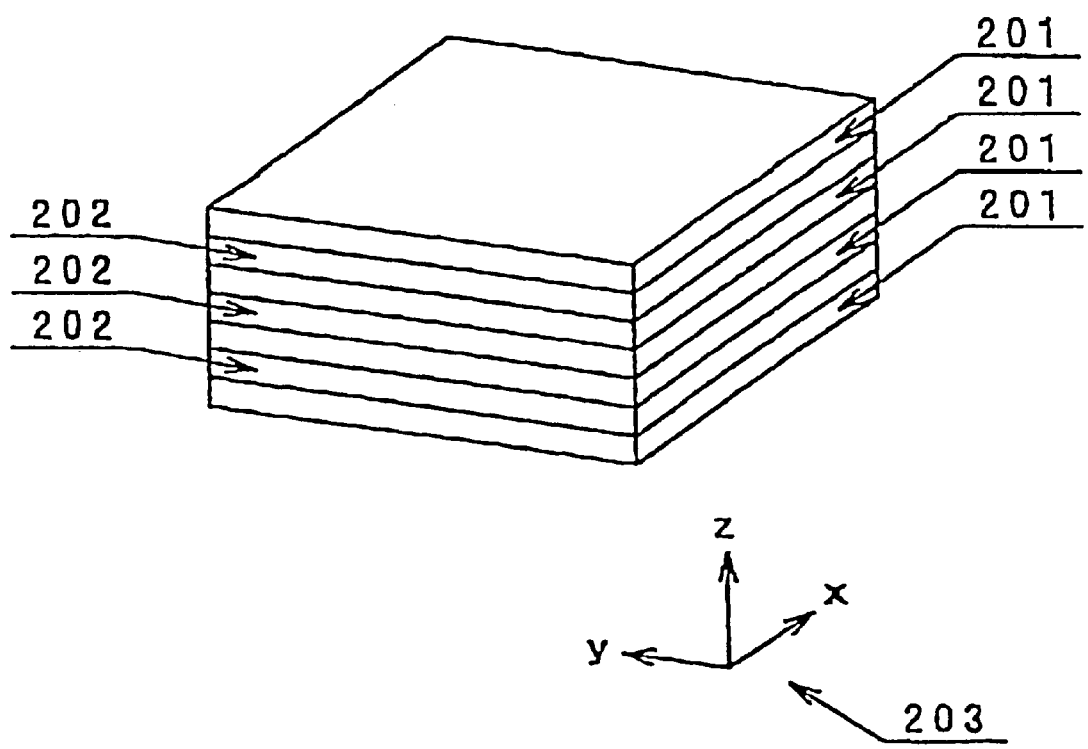
FIG. 2 is a perspective view illustrating the essential part of the construction of the liquid crystal display device of the present invention in accordance with example 1 to example 4.

Next, the structure of the reflective polarizer is described. FIG. 2 is a drawing illustrating the essential part of the construction of the reflective polarizer. The reflective polarizer is primarily a birefringent multi-layered dielectric film comprised of two kinds of alternately laminated polymer layers 201 and 202. One of two kinds of polymer is selected from materials with high photoelasticity and another from those with low photoelasticity. On such selection, care should be taken to ensure that the refractive index for the ordinary layer becomes approximately equal when both layers are stretched. For example, PEN (2.6-polyethylene naphthalate) may be selected as high photoelasticity material and coPEN (70-naphthalate/30-terephthalate copolyester) as low photoelasticity material. Both materials are alternately laminated and stretched at a stretch ratio of about 5:1 along the direction of the x-axis of the rectangular coordinate system 203 of FIG. 2 and the refractive index along the x-axis was at 1.88 in the PEN layer and 1.64 in the coPEN layer. The refractive index along the y-axis was at about 1.64 in both the PEN and coPEN layers. When light is impinged in the normal direction on the surface of the laminated film, a component of the light oscillating in the direction of the y-axis passes through the film. This is the polarization axis. On the other hand, a light component oscillating in the direction of the x-axis is reflected only when the PEN and coPEN layers meet a certain condition. This is a reflection axis. The condition is that the sum of optical path (the product of the refractive index and the film thickness) of the PEN layer and that of the coPEN layer is equal to a half wavelength of the light. By laminating such PEN layers and coPEN layers in more than several dozens or more than a hundred layers, if possible, in thickness of about 30 μm, almost all of the light component oscillating along the x-axis can be reflected. A reflective polarizer made in this manner only generates polarization in the light with a designed single wavelength. Accordingly, by laminating a plurality of reflective polarizers with different design wavelengths with their axes aligned, it is possible to produce a film with polarization capability in a wide range of wavelengths.

This reflective polarizer is more than 30% brighter than the reflective polarization means which is constructed by combining a conventional reflective polarizer with an aluminum reflective plate. There are two reasons. One of the reasons is that the reflective polarizer reflects almost 100% of the predetermined linear polarization light while the reflectivity of metal aluminum is only a little less than 90%. Another reason is that conventional absorption type polarizers waste some 20% of light because they utilize halogen materials such as iodine or dichroic materials such as dye, of which the dichroic ratio is not necessarily high.

Otherwise it is possible to use liquid crystal polymers which exhibit a cholesteric phase for a reflective polarizer. This material reflects the predetermined circular polarized light component and passes other light components. Such a reflective polarizer is disclosed in detail in Japanese Unexamined Patent Publication No. 8-271892 which is incorporated by reference herein.

An EL element in FIG. 3(a), for example, can be employed as the backlight assembly 109 of FIG. 1. In FIG. 3, 301 is a glass substrate, 302 a transparent electrode, 303 a first dielectric layer, a hatched area 304 an EL emission layer, 305 a second dielectric layer, 306 a rear electrode, 307 a rear sealing glass, and a hatched area 308 a light absorbing plate. A common type of EL layer made by dispersing fluorescent powder in a binder can be used but it is preferred to use recently-developed organic ultra-thin film as it provides better transparency. A transparent ITO is used as the rear electrode. Accordingly, the EL backlight assembly is substantially transparent in a non-emissive state. By the way, transparent polymer films such as polyester may be utilized in place of glass substrates.

In this example a light absorbing plate is disposed behind the EL backlight assembly but it may be placed in any position as long as it is behind the EL emission layer. In FIG. 3(b) it is disposed within the EL backlight assembly. In FIG. 3(b), 311 is a glass substrate, 312 a transparent electrode, 313 a first dielectric layer, a hatched area 314 a EL emission layer, 315 a second dielectric layer, 318 a light absorbing plate, 316 a rear electrode, and 317 a rear sealing glass. In this case, the rear electrode 316 may be made of non-transparent metal. The light absorbing plate was obtained by laminating thin metal oxides.

Figure 4:
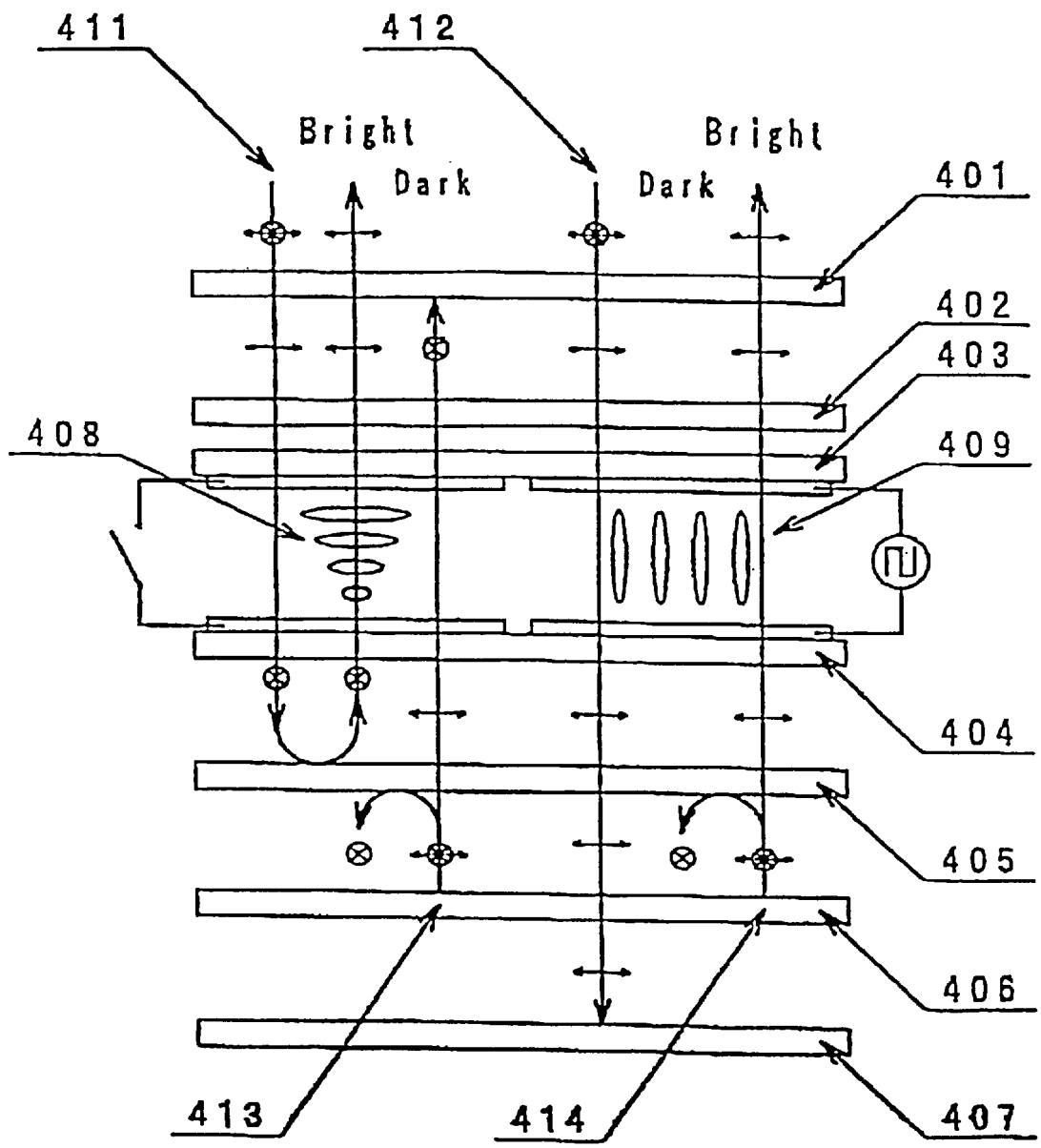
FIG. 4 is a schematic illustration of the function of the liquid crystal display device of example 1 of the present invention.
Figure 5A:
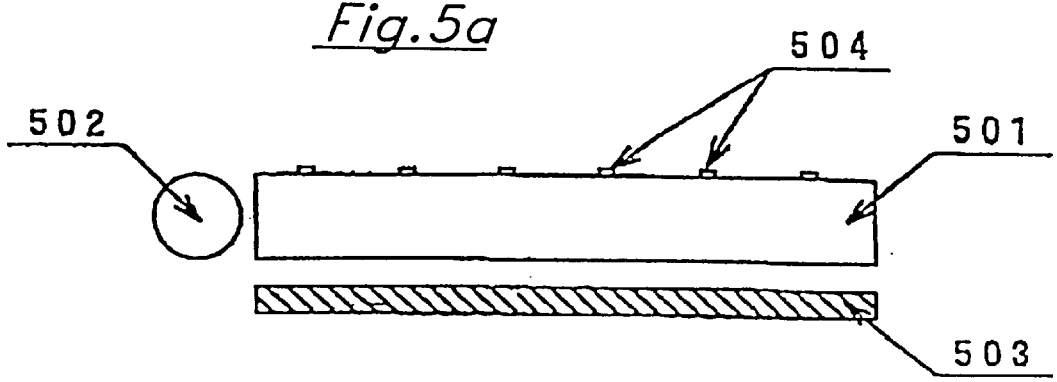
Figure 5B:
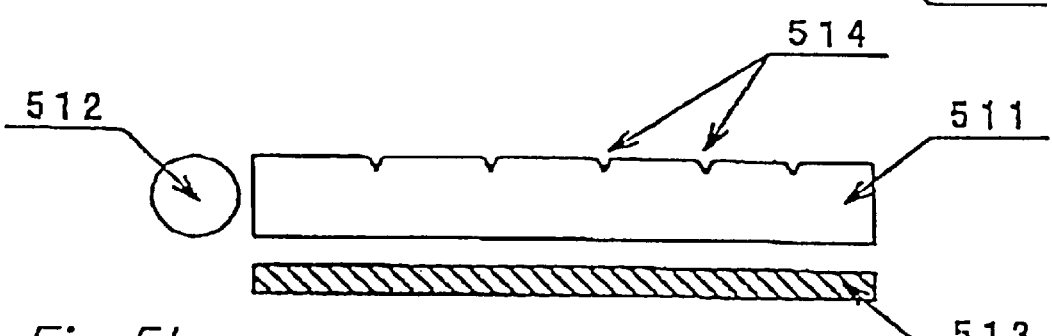
Figure 5C:
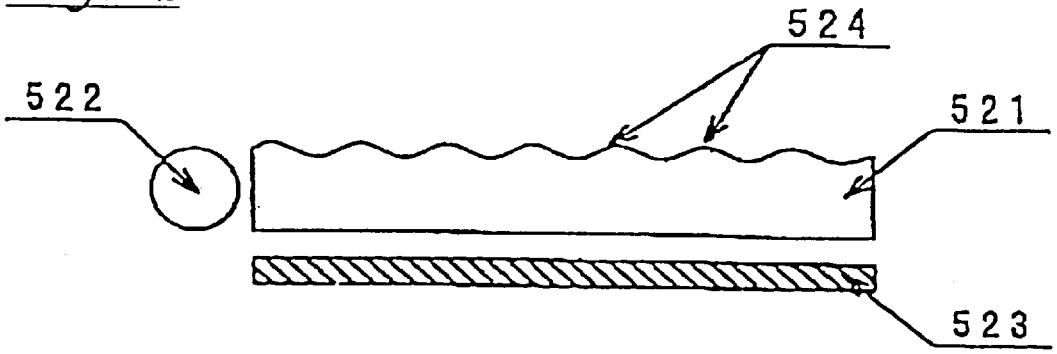
Figure 5D:
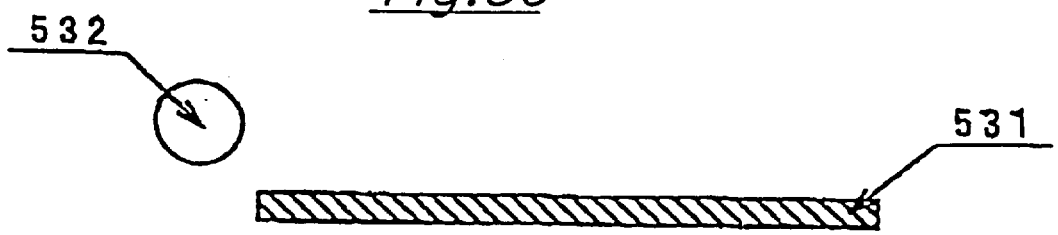

The function of the liquid crystal display device of example 1 is described by referring to FIG. 4. In FIG. 4, 401 is a polarizer, 402 a retardation film, 403 an upper glass substrate, 404 a lower glass substrate, 405 a reflective polarizer, 406 a backlight assembly substantially transparent in non-emissive state, 407 a light absorbing plate, 408 a liquid crystal in an OFF state, and 409 a liquid crystal in an ON state.

First, the case of a non-emissive state of the backlight assembly, or the case of the reflective mode is discussed. The light 411 and 412 incident from above is converted to linear polarized light by the polarizer 401. Then, the linear polarized light is modulated variously by the retardation film and the liquid crystal panel but it is mostly restored to the linear polarized light when it impinges on the reflective polarizer 405. However, the linear polarized light in the area 409 where the liquid crystal panel is ON and the linear polarized light in the area 408 where it is OFF cross each other at a right angle, respectively. The axis of the reflective polarizer is disposed in advance so as to reflect the linear polarized light in an OFF state and transmit the linear polarized light in an ON state. In an OFF state the liquid crystal display device is set in the bright display mode as the linear polarized light reflected on the reflective polarizer is emitted to the upper side along the same path as above, while in an ON state the liquid crystal display device is turned to the dark display mode as the linear polarized light transmitted through the reflective polarizer passes through the transparent backlight assembly 406 to be absorbed by the light absorbing body 407. When the liquid crystal display device panel is in an intermediate state between ON and OFF states, the liquid crystal display device exhibits a half-tone display as both of them mix together.

Next, the case of an emissive mode of the backlight assembly, or the case of the transmissive mode is discussed. Under the circumstance of the transmissive mode of the liquid crystal display device, it is supposed that the ambient illumination is sufficiently dark, so the light incident from above is negligible. Out of the light 413 and 414 emitted from the backlight assembly, the linear polarized light with a certain orientation is reflected by the reflective polarizer, while the remainder of the linear polarized light passes through the reflective polarizer. The linear polarized light transmitted passes along the same path as in the reflective mode to exhibit a bright-dark display. The reflected linear polarized light is lost by being absorbed by the light absorbing plate 407 but some of the light scattered on the surface of the backlight assembly etc., reaches the reflective polarizer again. Compared with conventional transflective display, the liquid crystal display device of the present invention is two or three times more effective as it has no transflector.

However, here arises one difficult problem. The linear polarized light reflected on the reflective polarizer in the reflective display mode and the linear polarized light transmitted through the reflective polarizer in the transmissive display mode are not the same but they have orientations crossing at a right angle to each other. Accordingly, the brightness and darkness is reversed in the reflective display mode and the transmissive display mode. If the ambient light is sufficiently bright so as not to be negligible, the display is sometimes difficult to see as both of them mix together. Also, especially in the case of conducting the color display by incorporating the color filter in the liquid crystal panel, it becomes difficult to see as not only reversal of brightness and darkness but also, color reversal takes place, too.

To solve such a problem, for example, in the monochrome display, it is effective to adopt a color for the light of the backlight assembly quite different from that of the reflective display of the liquid crystal panel. Also, it is very effective to convert displayed data so as to reverse the display of the liquid crystal panel between the reflective mode and the transmissive mode. This method is discussed in detail in example 4.

The luminance factor of the backlight assembly of the liquid crystal display device of the present invention in the non-emissive mode discussed above was measured as follows: first, the specimens are those members located lower than reflective polarizer 108 of FIG. 1, or the light emitting member 109 and the light absorbing plate 110. These specimens were illuminated from all directions using an integration sphere to measure its luminance in the direction of the normal plane. A ratio of the luminance thus obtained to that of a standard white plate of barium sulfate measured likewise is the luminance factor. The result of the measurement was in the range of 17%–32%. For comparison, the luminance factors of conventional backlight assemblies were measured and they were found to be in a range of 57% to 78%, showing that the backlight assembly used in the present invention appears fairly dark. By using such a backlight assembly, the liquid crystal display device of the present invention can attain a high degree of contrast such as over 1:5 in the reflective display mode.

EXAMPLE 2

Example 2 is another embodiment of the present invention. The construction is almost the same as the liquid crystal display device in example 1 shown in FIG. 1 but, as illustrated in FIG. 5, backlight assemblies are used such as a fluorescent tube, an LED (light emitting diode) or a light bulb in a light guide system in place of a surface light source such as an EL. In FIG. 5(*a*), 501 is a light guide plate, 502 a light source, a hatched area 503 is a light absorbing body and 504 light diffusing elements. A plate of acrylic resin with high transparency is used as the light guide member 501. The light diffusing elements were provided by printing white paint. The area of the light diffusing elements is so minimal that it hardly damages transparency of the light guide member. The light diffusing elements 504 may be disposed on either the front or rear surface of the light guide member 501. In arranging the light diffusing elements, the distribution density is changed with a consideration for providing uniform surface illumination. Besides a cathode ray tube, a hot cathode ray tube, LED, or an incandescent lamp can be chosen as a light source 502. The backlight assemblies used in conventional transmissive liquid crystal display devices use a light reflecting plate in place of the light absorbing plate 503 and are provided with a light diffusing plate over the light guide member 501. But, by constructing as shown in FIG. 5(*a*), the backlight assembly becomes substantially black in a non-emissive state.

By changing the density of the light diffusing elements 504 variously, the luminance factor of the backlight assembly in the non-emissive state can be changed variously. The luminance factor was measured in the same manner as in FIG. 1 and the results of the measurements are presented in table I with corresponding contrasts in the reflective mode.

TABLE 1

| LUMINANCE FACTOR | CONTRAST |
| --- | --- |
| 6.2% | 8.1 |
| 9.5% | 8.2 |
| 14.6% | 8.0 |
| 19.1% | 7.8 |
| 26.4% | 7.4 |
| 32.3% | 6.9 |
| 38.7% | 6.3 |
| 45.6% | 5.8 |
| 54.9% | 4.7 |
| 61.0% | 3.6 |
| 69.3% | 2.1 |

The results of table 1 vary depending on the liquid crystal panel or illumination used but the tendency does not change. The smaller the luminance factor, the higher the contrast. The luminance factor of conventional backlight assemblies has been in the range of 57% to 78% but a large improvement in contrast will be available if the smaller luminance factor can be provided even in a small amount. However, if the luminance becomes less than 20%, such effect almost reaches saturation. Accordingly, it is desirable to make the luminance factor to be at least 40% or less, and preferably 20% or less.

FIG. 5(*b*) is an example of a backlight assembly with a light guide system. In FIG. 5(*b*), 511 is a light guide plate, 512 a light source, a hatched area 513 is a light absorbing plate and 514 sibos. Sibos are a plurality of small cavities which are formed directly on the light guide by injection molding. The light entering into the light guide emits from the cavities. This backlight assembly exhibits substantially black color in a non-emissive state, too.

FIG. 5(*c*) is also an example of the backlight assembly with a light guide. In FIG. 5(*c*), 521 is a light guide plate, 522 a light source, 523 a light absorbing plate and 524 a wave-shaped structure. The light entering into the light guide emits trough the wave-shaped structure. The wave-shaped structure is smooth enough to emit light with almost no damage to the transparency of the light guide. This backlight assembly exhibits substantially black color in a non-emissive state, too.

FIG. 5(*d*) is also an example of a backlight assembly with a light guide in a broad sense. In FIG. 5(*d*), 531 is a light absorbing plate and 532 is a light source. In this example air works as the light guide plate. This backlight assembly exhibits substantially black color in a non-emissive state, too. This backlight assembly has a feature of being very cheap even though it has a deficiency in surface uniformity of illumination.

EXAMPLE 3

Figure 6:
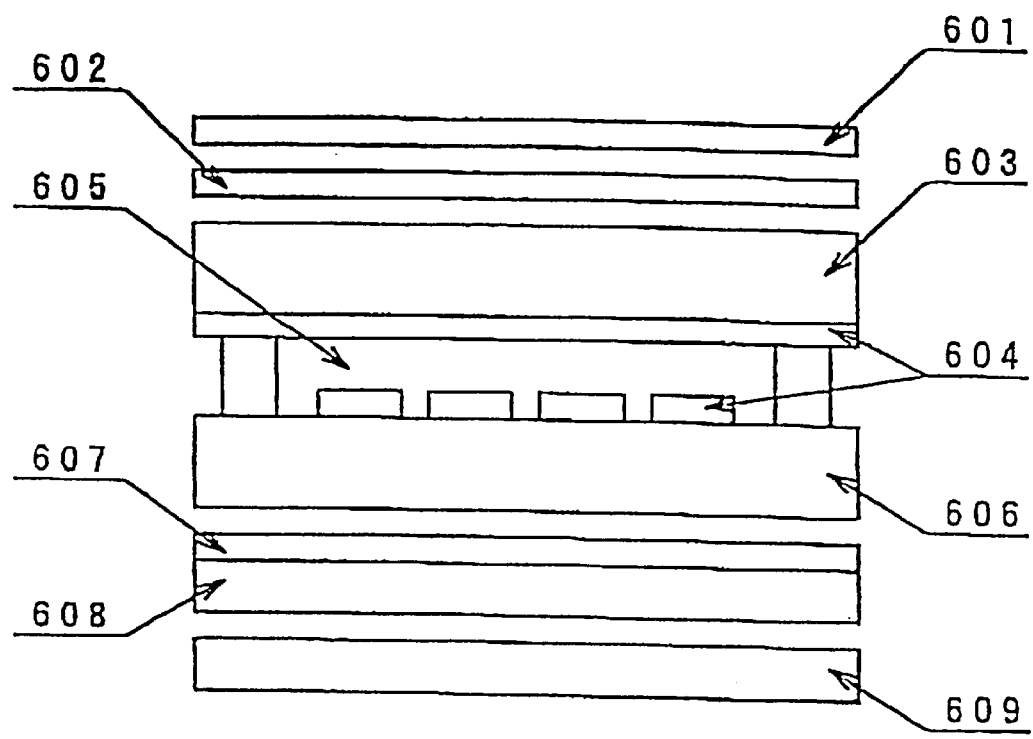
FIG. 6 is a vertical sectional view illustrating the essential part of the construction of the liquid crystal display device in accordance with example 3 of the present invention.

FIG. 6 is a drawing illustrating the essential part of the construction of a liquid crystal display device in accordance with another example of the present invention. First, the construction is described. In FIG. 6, 601 is a polarizer, 602 a retardation film, 603 an upper glass substrate, 604 a transparent electrode, 605 a liquid crystal layer, 606 a lower glass substrate, 607 a light diffusing plate, 608 a reflective polarizer, and 609 a backlight assembly.

Most of the elements are the same as the liquid crystal display device in accordance with example 1 but the backlight assembly is different. This backlight assembly has a feature that it is substantially black color in a non-emissive state by itself. In example 3, VFD (fluorescent character display tube) is used as a backlight assembly but other backlight assemblies such as an LED array, or a flat CRT etc., can be employed. By employing such backlight assemblies, the same effect is available as in the backlight assembly of example 1 without providing a light absorbing plate in the rear.

EXAMPLE 4

Figure 7:
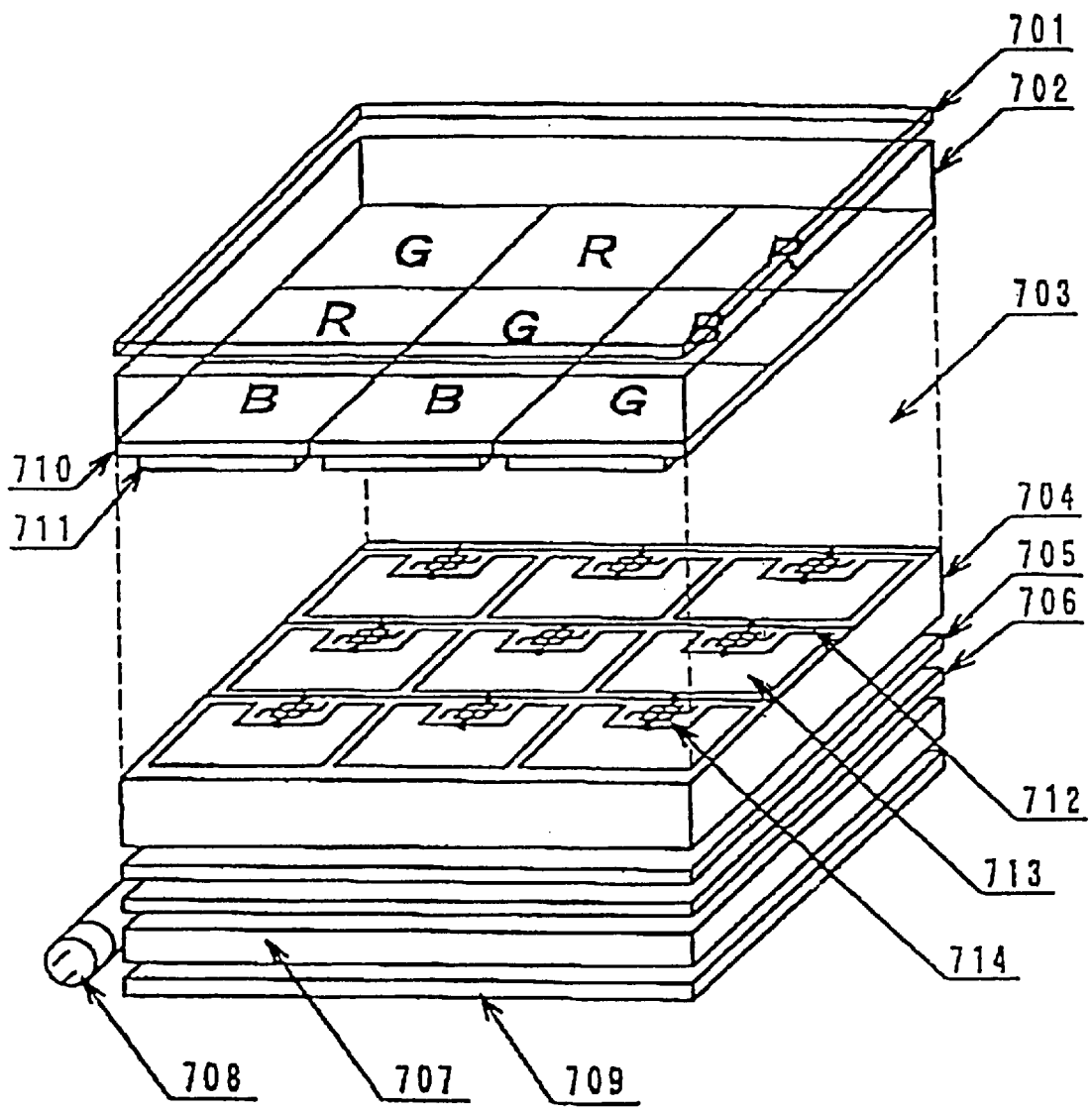
FIG. 7 is a perspective view illustrating the liquid crystal display device in accordance with example 4 of the present invention.

The liquid crystal display device described in the above embodiment can also exhibit color display. The following is an example:

FIG. 7 is a perspective view illustrating a liquid crystal display device in accordance with another example of the present invention. First, the construction is described. In FIG. 7, 701 is a upper polarizer, 702 an opposing substrate, 703 a liquid crystal, 704 a device substrate, 705 a light diffusing plate, 706 a reflective polarizer, 707 a light guide plate, 708 a light source, and 709 a light absorbing plate. A color filter 710 and opposing electrodes (scanning lines) 711 are provided on the opposing substrate 702 and signal lines 712, pixel electrodes 713, and MIM devices 714 are provided on the device substrate 704. In this instance, 701 and 702, 704 and 705, 705 and 706 are illustrated as being separated but this is just to make the drawing easy to understand and actually they are bonded together with adhesives. Also, the opposing substrate 702 and the device substrate 704 are depicted to have a wide gap between them for the same reason but actually they have only a gap of several μm to a dozen or so μm. Also, FIG. 7 illustrate a portion of a liquid crystal display device and shows only 3×3 matrices for 9 nodes which are formed by intersecting three scanning lines 711 and three signal lines 712 but actually the liquid crystal display device has many more nodes.

The opposing electrodes 711 and the pixel electrodes 713 are formed by transparent ITO, the signal lines 712 by metal Ta, and the MIM devices are constructed by sandwiching dielectric film of $Ta_2O_5$ by metal Ta and metal Cr. The liquid crystal 703 is 90 degree twisted nematic liquid crystal and the polarization axes of upper and lower polarizers cross at right angles to each other. This is a general construction of the normally-white TN mode. Also, the color filter 710 consists of three colors, or the three primary colors of the additive mixture of color, i.e., red (shown by "R" in the drawing), green (shown by "G" in the drawing), and blue (shown by "B" in the drawing) arranged in the mosaic fashion.

In this example a liquid crystal display device of a MIM active matrix system is presented but a passive matrix display may be employed without any damage to the effect of the present invention. In such a case the signal lines are formed by strip shaped ITO similar to the opposing electrodes without providing the MIM device and pixel electrodes. Also, in place of the TN mode, an STN mode is employed with a 180 to 270 degrees twisted liquid crystal display device. A retardation plate may be provided in order to compensate for coloring of the STN mode display.

As described in example 1, reversal of brightness and darkness of the display takes place in the liquid crystal display device of the present invention. In the color display, not only reversal of brightness and darkness occurs but also reversal of the color takes place, which results in a hard-to-see display. Therefore, the data signals are converted so as to reverse the display of the liquid crystal panel between the reflective display mode and the transmissive display mode.

Next, a specific method for the above conversion is presented. In the liquid crystal display device of the present invention, data signal voltages based on the data signals are provided through the signal lines 712 to the liquid crystal. The data signals used here are formed by converting the original data signals A into data signals B by a data signal conversion means. The conversion is switched by changing the ON/OFF state of the backlight assembly. Table 2 represents the conversion table.

TABLE 2

| BACKLIGHT | DATA SIGNAL A | DATA SIGNAL B |
|---|---|---|
| 0 | 0 | 0 |
| 0 | 1 | 1 |
| 0 | 2 | 2 |
| 0 | 3 | 3 |
| 0 | 4 | 4 |
| 0 | 5 | 5 |
| 0 | 6 | 6 |
| 0 | 7 | 7 |
| 1 | 0 | 7 |
| 1 | 1 | 6 |
| 1 | 2 | 5 |
| 1 | 3 | 4 |
| 1 | 4 | 3 |
| 1 | 5 | 2 |
| 1 | 6 | 1 |
| 1 | 7 | 0 |

The left column of table 2 shows the ON/OFF state of the backlight assembly with "0" as OFF and "1" as ON. The two columns on the right show data signals representing eight (8) grayshade signals by integers of "0" to "7". "0" means dark, while "7" shows bright, and from "1" to "6" representing brightness of display between dark and bright. In the OFF state of the backlight assembly, the data signals A are not converted but in the ON state all of the data signals A are reversed to get the data signals B. The conversion table is common to each node of red, green and blue, so that such conversion attains reversal of the displayed color (i.e., displays complementary colors). By utilizing the data signals thus converted, the color reversal, as well as the darkness and brightness reversal, can be corrected simultaneously.

One of the color display described is a method to utilize STN birefringent interference. Details of the liquid crystal display device are disclosed, for example, in Japanese Unexamined Patent Publication No. 6-175125. By substituting a reflective polarizer for a lower polarizer and a reflector of such a liquid crystal display device as described above and disposing such backlight assemblies as shown in FIG. 5 behind it, a transflective liquid crystal display device which is bright in both the reflective and transmissive modes is available. This liquid crystal display device has a problem in that the transmissive display is reversed. Thus, it is necessary to convert the data signals to correct the display. Table 3 shows the conversion table for doing so.

TABLE 3

| BACKLIGHT | DATA SIGNAL A | DATA SIGNAL B |
|---|---|---|
| 0 | 0 | 0 |
| 0 | 1 | 1 |
| 0 | 2 | 2 |
| 0 | 3 | 3 |
| 0 | 4 | 4 |
| 0 | 5 | 5 |
| 0 | 6 | 6 |
| 0 | 7 | 7 |
| 1 | 0 | 1 |
| 1 | 1 | 0 |
| 1 | 2 | 5 |
| 1 | 3 | 6 |
| 1 | 4 | 7 |
| 1 | 5 | 2 |
| 1 | 6 | 3 |
| 1 | 7 | 4 |

Figure 8:
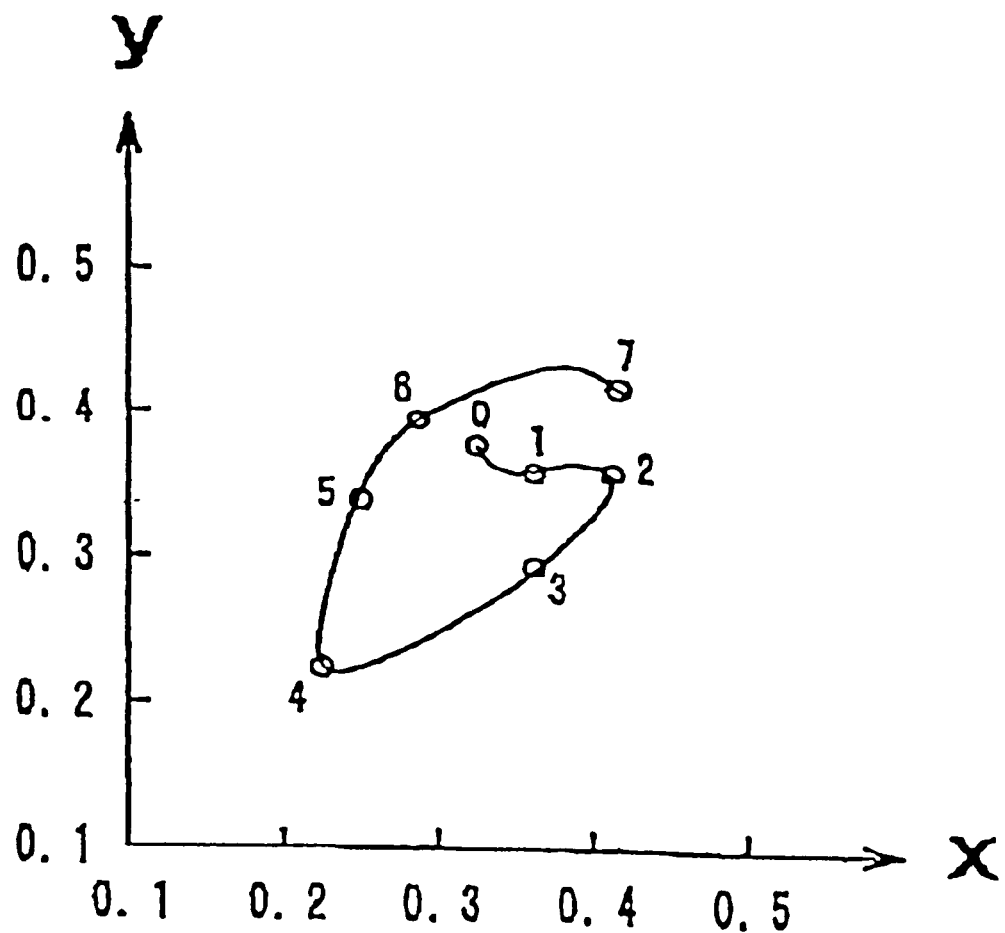
FIG. 8 is a diagram illustrating the displayed color in example 4 of the present invention.

The left column shows the ON/OFF state of the backlight assembly with "0" as OFF and "1" as ON. The two columns on the right show the data signals representing eight (8) grayshade signals by integers of "0" to "7". In the color display utilizing STN birefringent interference, the displayed color changes depending on the grayshade signals. FIG. 8 is a drawing illustrating the relationship between the grayshade signals and the displayed color on the chromaticity coordinates of CIE 1931 XYZ color display system. "0" corresponds to white in the displayed colors, "1" to black, "2" to red, "3" to magenta, "4" to blue, "5" to cyan, "6" to green, and "7" to yellow. In the OFF state of the backlight assembly the data signals A are not converted but in the ON state the data signals A are converted so as to display complementary colors of the data signals A to get the data signals B. This conversion is not a simple reversal as shown in Table 2. By utilizing the data signals thus converted, the color reversal, as well as the darkness and brightness reversal, can be corrected simultaneously.

EXAMPLE 5

Figure 9:
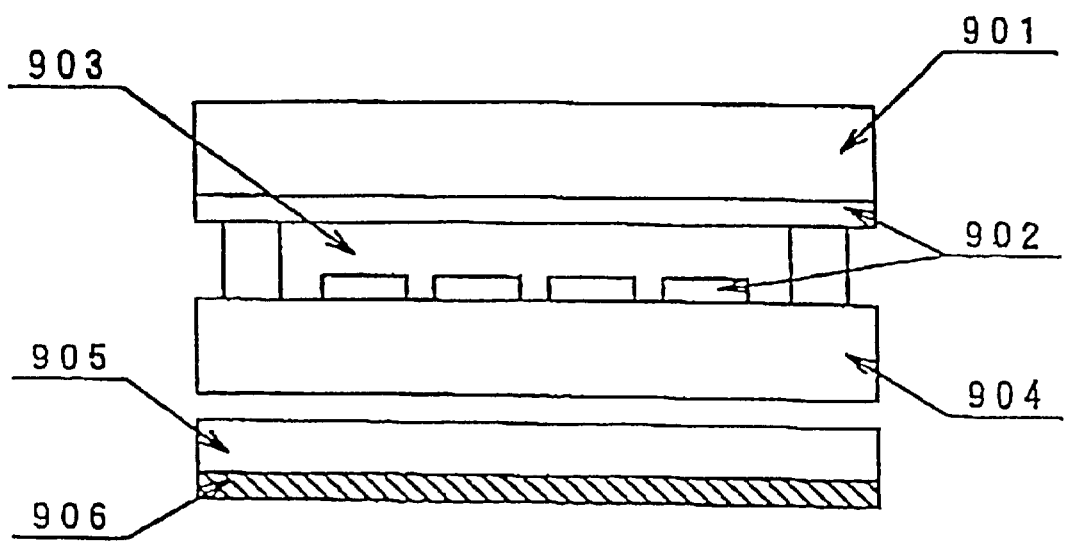
FIG. 9 is a vertical sectional view illustrating the essential part of the construction of the liquid crystal display device in accordance with example 5 of the present invention.

FIG. 9 is a drawing illustrating the essential part of the construction of the liquid crystal display device of another example of the present invention. First, the construction is described. In FIG. 9, 901 is an upper glass substrate, 902 transparent electrodes, 903 a chiral nematic liquid crystal layer, 905 a light emitting member of a backlight assembly which is substantially transparent in the non-emissive state, and a hatched area 906 is a light absorbing plate.

The chiral nematic liquid crystal layer 903 was prepared by mixing polymer, if necessary, to a liquid crystal of which pitch is adjusted so as to exhibit selective reflection in the visible light range. Application of a voltage pulse having a certain pulse height causes this liquid crystal layer to turn into a state to reflect a predetermined circularly polarized light component and transmit the polarized light component different from the predetermined component. Application of a voltage pulse having other pulse heights causes this liquid crystal layer to turn into a transparent state with very weak diffusion. Such a liquid crystal mode is disclosed in detail in SID92 DIGEST, pp. 759–761.

As a backlight assembly 905 and 906, an EL such as discussed in example 1 or a fluorescent tube, a LED or a light bulb etc. in the light guide system discussed in example 2 can be used. Also, the backlight assembly discussed in example 3 may be used which is substantially black in the non-emissive state by itself.

Next, the function of the liquid crystal display device of example 5 is described. In FIG. 9, the case of a non-emissive state of the backlight assembly 905, i.e., the case of a reflective display mode is first discussed. Of light incident from the upper direction, in the ON state of the liquid crystal panel, the circularly polarized light component in a certain wavelength range having a certain orientation is reflected, while the rest of the polarized light component is transmitted. The transmitted polarized light component is absorbed by the light absorbing plate 906, while the reflected polarized light component reaches the observer, exhibiting a glittering color display (green, for example). In the OFF state of the liquid crystal panel, all the light is transmitted and absorbed by the light absorbing plate, exhibiting a black display.

Next, the case of the emissive mode of the backlight assembly, or the case of the transmissive mode is discussed. Under the circumstance of the transmissive mode of the transflective liquid crystal display device, the ambient illumination is supposed to be sufficiently dark, so the light incident from above is negligible. Out of the light emitted from the backlight assembly 905, in the ON state of the liquid crystal panel, the circularly polarized light component having one orientation within a certain wavelength range is reflected, while the rest of the polarized light component is transmitted to reach the observer, exhibiting a color display (purple, for example). In the OFF state of the liquid crystal panel, the light of the backlight assembly is transmitted intact and, exhibits a bright display (white, for example).

In example 5, there is a similar problem as in example 1 in that the brightness and darkness, as well as color, is reversed in the reflective display mode and the transmissive display mode. Accordingly, it is effective to adopt a quite different color for the light of the backlight assembly from that of the reflective display of the liquid crystal panel.

EXAMPLE 6

Figure 10A:
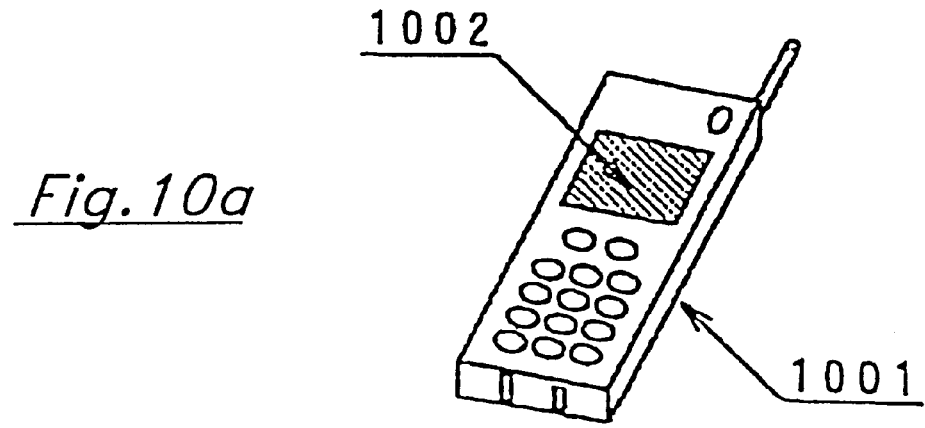
Figure 10B:
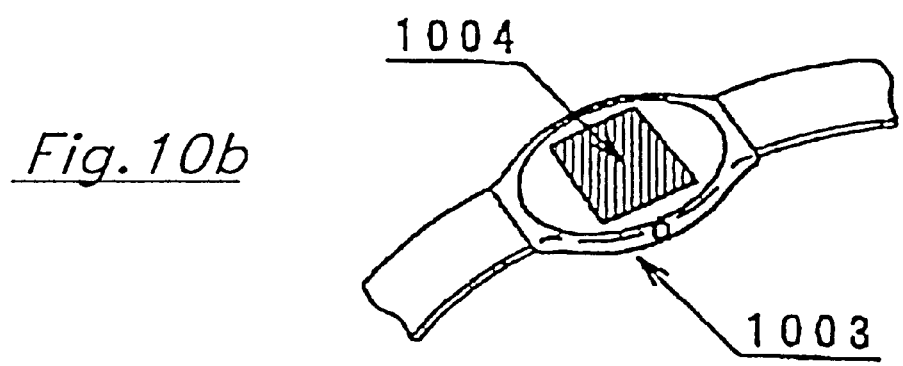
Figure 10C:
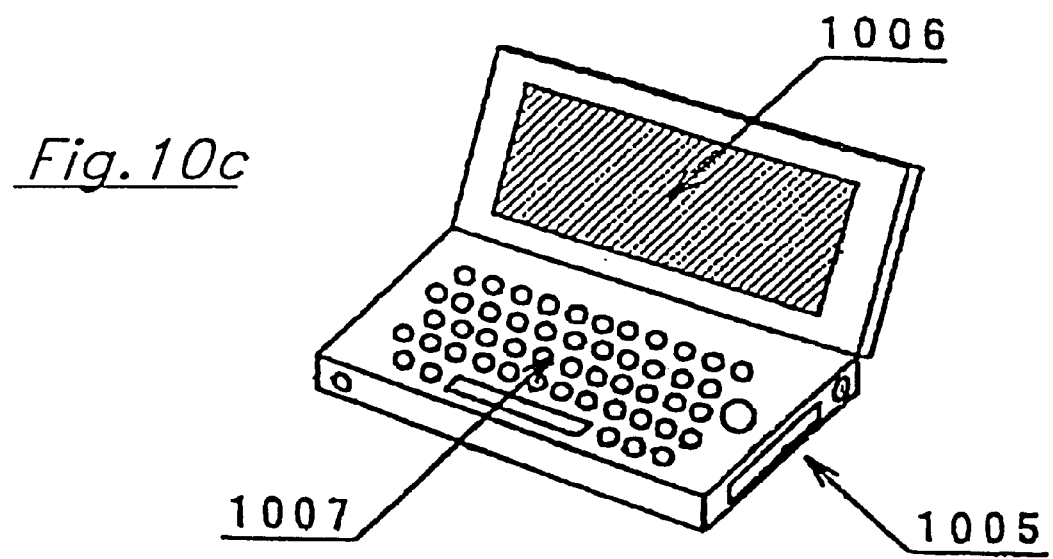
Figure 11:
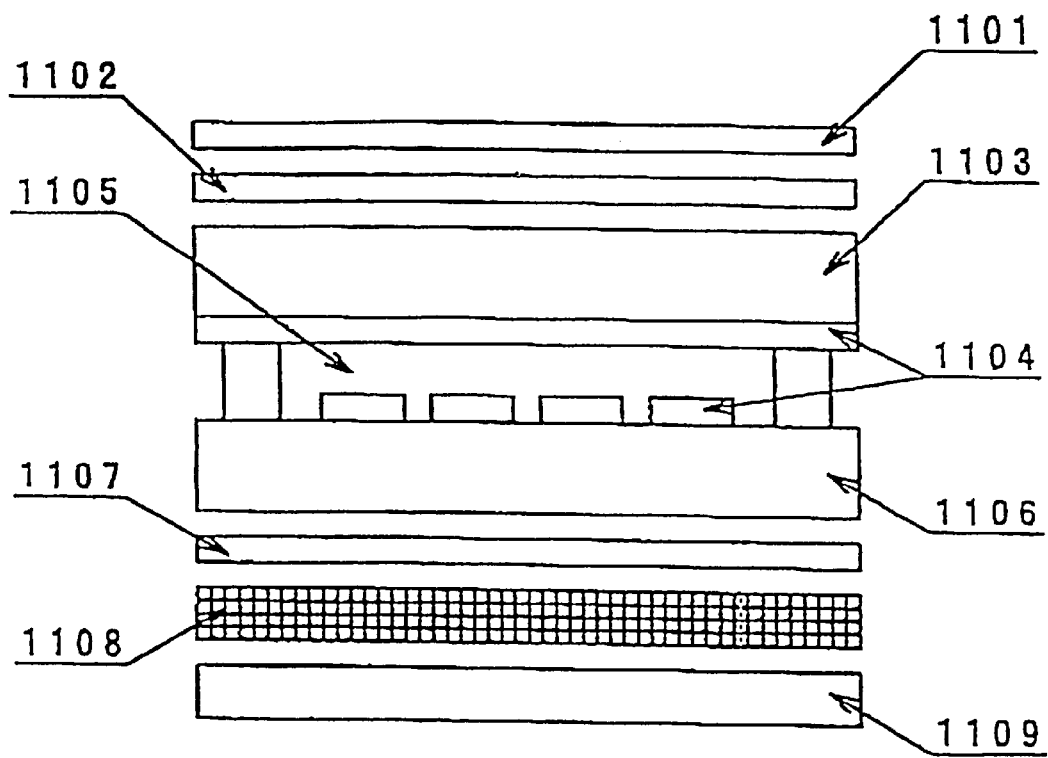
FIG. 11 is a vertical sectional view illustrating the essential part of the construction of a conventional transflective liquid crystal display device.
Figure 12:
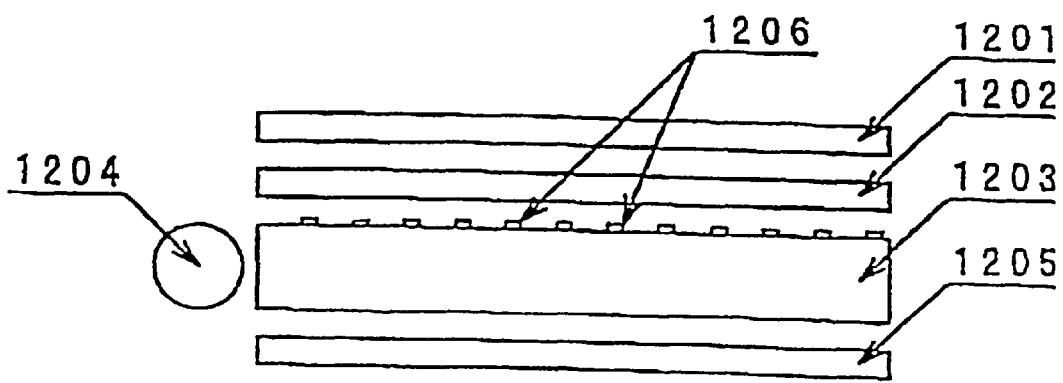
FIG. 12 is a vertical sectional view illustrating the construction of the backlight assembly employed in a conventional transflective liquid crystal display device.

Three examples of electronic apparatus embodying the present invention are shown in FIGS. 10(a)–10(c). The liquid crystal display device of the present invention is suitable to such portable equipment as used under various environments and required to have low power consumption.

FIG. 10(a) is a portable telephone with a display part 1002 on the upper part of the body 1001. The portable telephone can be used in all kinds of environments including indoors and out-doors. Besides, it is required that its battery should be able to work for at least more than 200 hours in stand-by mode. Accordingly, the transflective liquid crystal display device which can utilize the reflective display mode with low power consumption as its primary mode and which can be switched to the transmissive mode utilizing a supplemental light, if necessary, is most preferable for the display device to be used on a portable telephone. The liquid crystal display device of the present invention is brighter and sharper both in the reflective mode and in the transmissive mode than conventional transflective liquid crystal display devices.

FIG. 10(b) is a watch with a display part 1004 on the center of the body 1003. For watches, it is important to be fashionable. By changing the color of the backlight assembly, the liquid crystal display device of the present invention enables one to enjoy various colors in the transmissive mode without damaging the ease in looking at the reflective display. In design work it is advantageous to be capable of making various color displays in accordance with appearance.

FIG. 10(c) is a portable computer with a display member 1006 on the upper part of the body 1007 and an input member 1007 on the lower part. The portable computer has touch keys in the front of the display member so that the display tends to become dark. Accordingly, the reflective liquid crystal display device or the transmissive liquid crystal display device is preferably used. However, there is a problem in that the former is not visible in the dark and the latter has high power consumption and short battery life. The liquid crystal display device of the present invention is suitable even for such an application and it is possible to generate a bright display with low power consumption and it is possible to see even in the dark, if the backlight assembly is lit.

As aforedescribed, the present invention can provide a transflective liquid display device which is capable of making an efficient transmissive display without damaging brightness in the reflective display.

What is claimed is:

1. A transflective liquid crystal display device comprising:
   a liquid crystal panel;
   a reflective polarizer disposed on an opposite side as a viewer's side of said liquid crystal panel, said reflective polarizer reflecting light having a predetermined polarization orientation and transmitting light having a different polarization orientation from said predetermined polarization orientation; and
   a backlight assembly disposed on an opposite side of said reflective polarizer as said liquid crystal panel, said backlight assembly having a luminance factor of 40% or less in a non-emissive state.

2. The liquid crystal display device of claim 1 wherein said backlight assembly includes a member for emitting light in a direction toward said reflective polarizer and a light absorbing body capable of absorbing light incident from a direction of said reflective polarizer.

3. A liquid crystal display device of claim 1 wherein said backlight assembly includes a light source, a light guide for emitting light from said light source in a direction toward said reflective polarizer and a light absorbing body capable of absorbing light incident from a direction of said reflective polarizer.

4. A transflective liquid crystal display device comprising:
   a liquid crystal panel including a liquid crystal layer sandwiched between a pair of substrates, said liquid crystal layer being adapted to enable switching between a first state for reflecting a first polarized light component having a predetermined orientation while transmitting a second polarized light component having a different orientation than that of said first polarized light component and a second state for transmitting essentially all light; and
   a backlight assembly disposed on a back of said liquid crystal panel, said backlight assembly having a light absorbing capability in a non-emissive state.

5. A transflective liquid crystal display device comprising:
   a liquid crystal panel;
   a reflective polarizer disposed on an opposite side of said liquid crystal panel as a viewer's side, said reflective polarizer reflecting light having a predetermined polarization orientation and transmitting light having a different polarization orientation from said predetermined polarization orientation; and
   a backlight assembly having a luminance factor of 40% or less in a non-emissive state disposed on an opposite side of said reflective polarizer as said liquid crystal panel, wherein said liquid crystal panel is capable of emitting light towards the reflective polarizer incident from said viewer's side of said liquid crystal panel, and wherein a polarization axis of the light emitted from said liquid crystal panel can be varied corresponding to an ON and OFF state of said backlight assembly so as to make a displayed color in said ON state and a displayed color in said OFF state of the backlight assembly have a complimentary color relationship.

6. A transflective liquid crystal display device of claim 5 wherein the liquid crystal panel is driven by applying voltage to nodes formed on each crossing point of a plurality of data lines and a plurality of scanning lines, and wherein a polarizing axis of light emitted from said liquid crystal panel is varied by changing said voltage applied to said nodes corresponding to an ON and OFF state of said backlight assembly.

7. A transflective liquid crystal display device of claim 6 wherein data signals applied to said data lines are converted so as to change said voltage applied to said nodes corresponding to said ON and OFF state of said backlight assembly.

8. A transflective liquid crystal display device of claim 1, further comprising a polarizer disposed on said viewer's side of said liquid crystal panel.

9. A transflective liquid crystal display device of claim 1 wherein said reflective polarizer comprises a birefringent multi-layered dielectric film.

10. A transflective display liquid crystal device of claim 1 wherein said reflective polarizer comprises a cholesteric layer and a quarter wave plate.

11. A transflective display liquid crystal device of claim 1 wherein said backlight assembly comprises an EL element with a light absorbing body disposed on a rear surface thereof.

12. A transflective liquid crystal display device of claim 2 wherein said member comprises a light source and a light guide, and said light absorbing body is disposed on a back surface of said light guide.

13. A transflective liquid crystal display device of claim 12 wherein said light source is a fluorescent tube or LED.

14. A transflective liquid crystal display device of claim 1 wherein an organic LED, a VRD or flat CRT is employed as said backlight assembly.

* * * * *